United States Patent [19]
Wrenn et al.

[11] 3,759,062
[45] Sept. 18, 1973

[54] RECEIVER DRIER HOUSING FOR AUTOMOBILE AIR CONDITIONING SYSTEMS

[75] Inventors: George T. Wrenn, Crittenden; H. William Mann, Portsmouth, both of Va.

[73] Assignee: Virginia Chemicals Inc., Portsmouth, Va.

[22] Filed: Aug. 14, 1972

[21] Appl. No.: 280,311

[52] U.S. Cl............ 62/474, 62/77, 62/125, 62/149
[51] Int. Cl............................. F25b 43/00
[58] Field of Search.............. 62/77, 292, 298, 62/474, 125, 149

[56] References Cited
UNITED STATES PATENTS

| | | | |
|---|---|---|---|
| 2,019,421 | 10/1935 | Link.................. | 62/292 X |
| 2,758,719 | 8/1956 | Line.................. | 62/474 |
| 2,835,114 | 5/1958 | Shoemaker............ | 62/474 |
| 3,080,977 | 3/1963 | Jones................. | 62/474 |
| 3,118,288 | 1/1964 | Small................. | 62/292 |
| 3,424,181 | 1/1969 | Morse................. | 62/292 |
| 3,525,231 | 8/1970 | Armstrong............ | 62/125 |
| 3,545,227 | 12/1970 | Grohl................. | 62/474 |

Primary Examiner—William J. Wye
Attorney—David H. Semmes

[57] ABSTRACT

Air conditioning and refrigeration systems, particularly a precharged receiver drier housing, including a valve connector port at the top fittable with a conventional air conditioning or refrigeration system so as to charge the system with a refrigerant gas. The housing includes an axially depressible induction tube extending from the connector port beneath a molecular sieve positioned within the housing. The unit is activated or deactivated with respect to the air conditioning system by simply turning a valve in the connector port. This valve enables convenient and money-saving retention of the refrigeration charge in the air conditioning system, while the filter drier is being replaced and, therefore, has particular application in automobile air conditioning systems.

15 Claims, 6 Drawing Figures

Patented Sept. 18, 1973  3,759,062

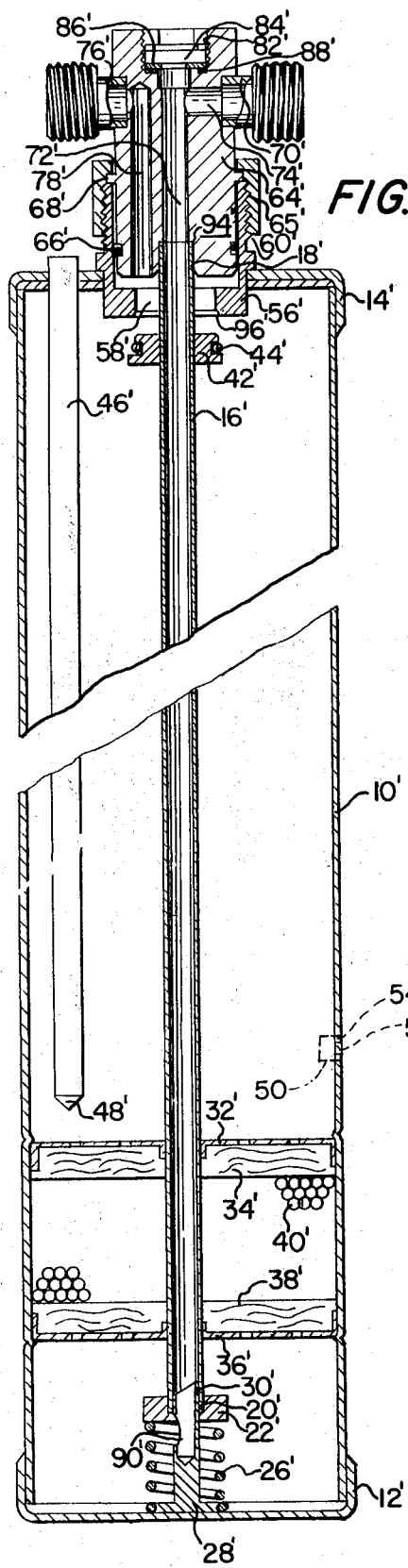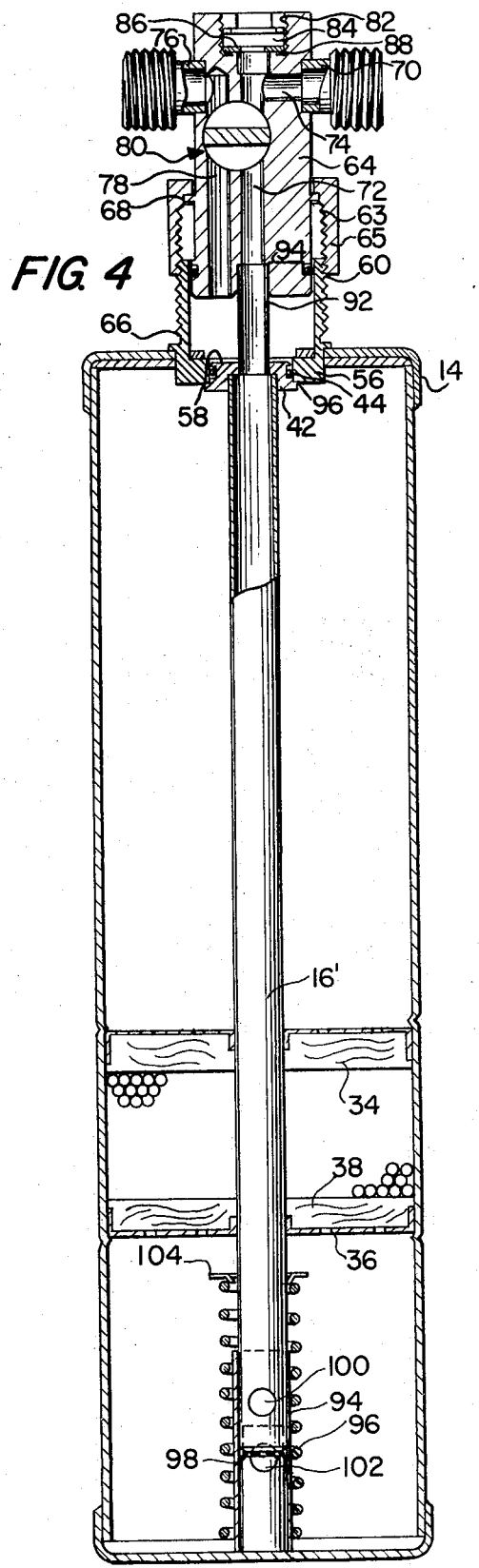

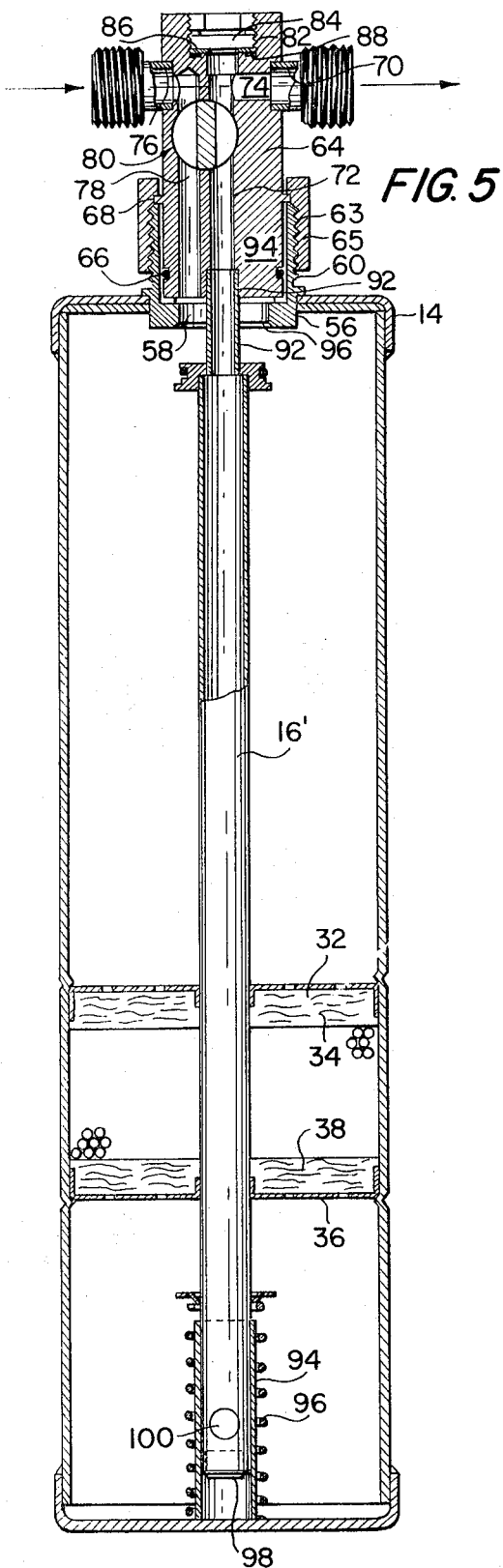
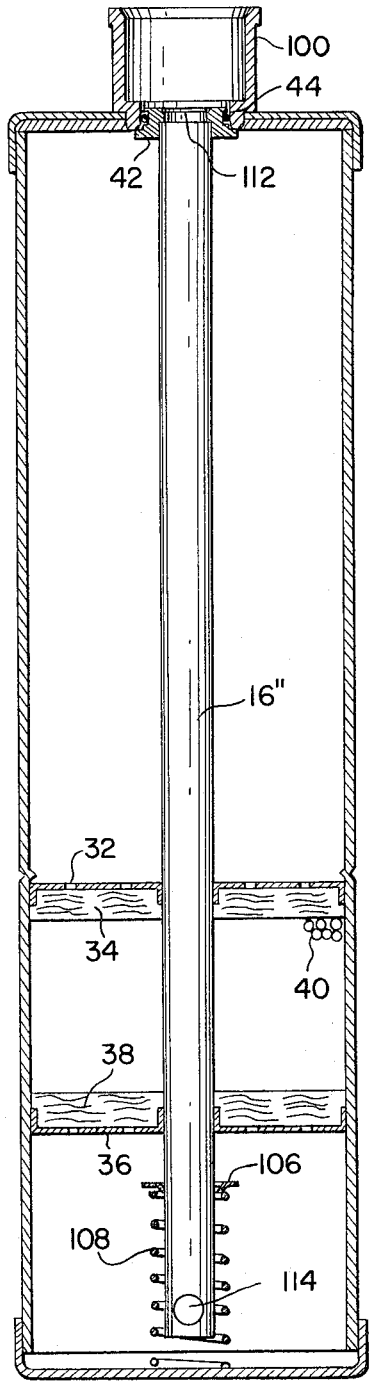
FIG. 5
FIG. 6

3,759,062

RECEIVER DRIER HOUSING FOR AUTOMOBILE AIR CONDITIONING SYSTEMS

CROSS REFERENCE TO RELATED APPLICATIONS

This is an improvement upon the structure disclosed in PRECHARGED RECEIVER DRIER FOR AUTOMOBILE AIR CONDITIONING SYSTEMS (U.S. Pat. No. 254,287), filed May 16,1972. The present construction contains an improvement of the axial induction tube and the tube seals, as well as the valve connector which is fitted into the top of the housing as the filter drier is connected to an auto air conditioning system.

BACKGROUND OF THE INVENTION

1. Field of the Invention

Refrigerant systems particularlyminiaturized automobile refrigerant systems characterized in their relatively confined array and difficult accessibility for recharging with refrigerant. Conventionally, the automotive refrigerant system is vented when it is recharged. This venting of the system to the atmosphere has obvious deleterious effects. Also, the attempt to recharge is required to be metered from a master container with relative inaccuracy.

2. Description of the Prior Art

| SMALL | 3,118,288 |
| LINE | 2,758,719 |

Small is an earlier attempt to avoid complete venting of the automotive refrigerant system to the atmosphere prior to recharging. According to Small, the precharged unit has a frangible diaphragm which is punctured, as the house embodying the refrigerant charge and drier material is fitted onto the system. The diaphragm provides somewhat less than a satisfactory seal between the prevents the unit from being re-used or recharged.

Line's dehydrator contains a rigid axial induction tube. There is no capability of sealing the tube from the system once it has been engaged.

SUMMARY OF THE INVENTION

According to the present invention the receiver drier housing is constructed so as to be readily fitted to a valve connector and, thence, to the air conditioning or refrigeration system.

The housing includes a top valve fitting port and a medially positioned molecular seive desiccant platform. An axial induction tube extends co-axially through the top port and the desiccant. Upon fitting of the connector valve to the housing, the induction tube is depressed so that its end is opened below the desiccant, permitting the refrigerant to flow through the desiccant prior to its distribution into the automobile refrigerant system via an outlet port. The valve connecting pice may be provided with its own valving system, such that for example, the utomobile system may be shut off, so as to retain the regrigerant charge, during attachment and removal of the eceiver drier from the automobile system. The receiver drier enables, therefore, partial charging of an air conditioning or refrigeration system without contamination or loss of refrigerant presently in the systems.

BRIEF DESCRIPTION OF THE DRAWING

FIG. 3 is a front elevation, partially in section, showing a modification of the valve connector wherein the valving element in the connector fitting piece has been eliminated;

FIG. 4 is a front elevation, partially in section, of a modification of the invention wherein the induction tube has a lower hole registrable with a hole in a bottom axial sleeve as the connector valve is fitted to the top of the housing;

FIG. 5 is a similar view of the FIG. 4 modification, showing registration of the induction tube hole with its counterpart hole in the bottom sleeve as the tube is depressed;

FIG. 6 is a front elevation of a modified housing having an induction tube with its frangible seal positioned at the top.

Figures 1, 2:
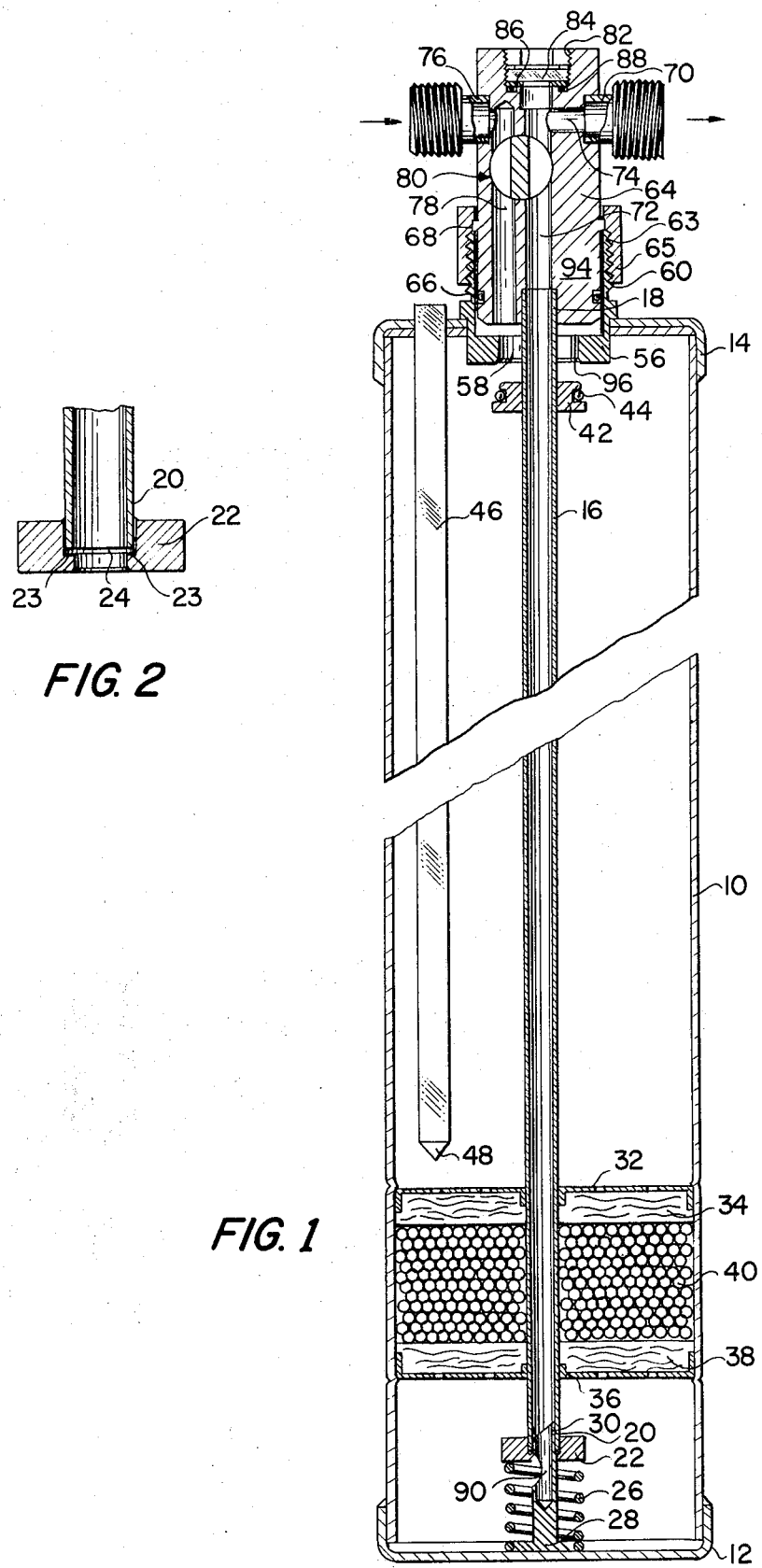
FIG. 1 is a front elevation, partially in section, showing the receiver drier housing and its axial induction tube depressed by the valve connector at the top so that the bottom of the tube opens below the desiccant platform.
FIG. 2 is an enlarged fragmentary front elevation, partially in section, showing the positioning of a frangible copper sealing disc at the bottom of the induction tube.

DESCRIPTION OF THE PREFERRED EMBODIMENTS:

As illustrated in FIG. 1 receiver drier housing 10 is provided with bottom cap 12 and top cap 14 which may be secured thereof by means of weldments or the like. Axial induction tube 16 extends through connector fitting port 56 opening 58 and corresponding top sealing member 42 with its O-ring seal 44 seated in the port 56. Induction tube 16 bottom end 20 extends into bottom seal 22.

As illustrated in FIG. 2, induction tube bottom 20 may be fitted with an inner copper disc seal 24 seated upon inner shoulders 23 in seal 22. As a top fitting valve 64 is fitted onto the connecting port 56 by means of swivel nut 65, induction tube 16 is depressed as illustrated in FIG. 1, such that the seal 24 is pierced by a probe 28 having an upper piercing element 30 and lateral opening 90, releasing refrigerant into the housing above the molecular sieve desiccant 40 secured by fitters 34 and 38 between perforated plates 32 and 36. The refrigerant then returns to the automotive refrigerant system through port 72 and its lateral exteriorally threaded extension 70. "A compression spring 26 may be interposed between "probe 28 and seal 22."Valve connector 64 may include lower shoulders 68, such that turning to of swivel nut 65 threads 63 against connector threads 60 moves the inner shoulder 94 downwardly against induction tube 16, as the valve connector is seated in port 56. The valve may include axial exit port 72, communicable with lateral channel 74 and threaded receiving element 70. As illustrated in FIG. 1, a rotatable valve 80 extending through the side of the valve connector 64 housing may be positioned to open the inlet and outlet ports, 76 and 78 as desired. A central sight flass 84 may ve fitted by means of threads 82, epoxy or other sealant, in the top of the housing and may include a dough-nut like moisture indicating element 86 seated upon sealing gasket 88.

In the receiver drier illustrated in FIGS. 1 and 2, a lucite or similar rod 46 extends into the housing as a liquid level indicator. Rod 46 may have a top 48, truncated, for example, as the angle of refraction of the refrigerant liquid.

In the FIG. 3 modification, the rotatable valve 88 is omitted. However, there is illustrated in phantom an optional moisture indicating window 50, having sight glass 52 and corresponding moisture indicating element 54 to indicate the level of moisture within the housing.

In the FIGS. 4 and 5 modification, the axial induction tube 16' extends into nylon or similar sleeve 94 supported centrally of bottom compression spring 96 by means of lock washer 104. A top axial probe 92 extends above the housing so as to depress induction tube 16', as the valve connector 64 is fitted to the housing. Aperture 100 at the bottom of induction tube 16' must be registered with corresponding aperture 102 in the nylon sleeve 94, so as to permit passage of refrigerant. A bottom plug 98 may be provided to prevent movement of refrigerant gas prior to the downward positioning of axial tube 16', as illustrated in FIG. 5.

In the modification illustrated in FIG. 6, axial induction tube 16" has a bottom aperture 114 positioned beneath the lock ring 106 securing bottom compression means 108. A top seal 42 having exterior O-ring 44 is provided; however, the top of the tube 16" is provided with a frangible upper seal 112 exposed within the modified top fitting piece 100. In this embodiment the valve fitting at the top must have a probe extensible inwardly of the tubes so as to fracture the seal 112.

As will be apparent, applicant has provided a receiver drier housing which is eadily adaptable to a variety of automobile refrigeration systems and fitting valves to enable simplified servicing of automobile air conditioning systems and replacement of regrigerant gas without loss of refrigerant charge. Also, there is provided a visual means for signalling the need for service, as well as elimination of the costly valving and desiccator housings which are conventionally used. Manifestly, the housing and induction tube may be varied extensively without departing from the spirit of invention.

We claim:

1. A receiver drier housing of the type adapted for fitting in air conditioning and refrigeration systems, comprising:
    A. a connector fitting port at one end of said housing and connectable with a closed system;
    B. a sieve medially positioned within said housing;
    C. an induction tube extending co-axially through said connector fitting port and said sieve, said tube at its bottom end opening into said housing;
    D. means of sealing said induction tube intermediate said connector fitting port and said sieve; and
    E. a bottom compression means supported intermediate a lower portion of said induction tube and said housing bottom, said induction tube being reciprocable within said housing against said compression means.

2. A precharged receiver drier housing as in claim 1, including a refrigerant gas contained within said housing and a desiccant supported adjacent said sieve.

3. A precharged receiver drier housing as in claim 1, including a top sealing means positioned around said induction tube within said connector fitting port, so as to seal said connector fitting port.

4. A precharged receiver drier housing in claim 1, said sieve being of the molecular type, including desiccant and being mounted in said housing above said bottom compression means and said means of sealing said induction tube and having an associated screen enclosing said desiccant.

5. A precharged receiver drier housing as in claim 4, said connector fitting port including exterior threads and swivel nut means engageable with a valve connector.

6. A precharged receiver drier housing as in claim 5, including a liquid level indicating means extending through the top of the housing axially toward said desiccant so as to indicate the liquid level within said housing.

7. A precharged receiver drier housing as in claim 20, including valve means intersecting said inlet and outlet ports, so as to valve said receiver drier with respect to an automobile refrigeration system communicating with said parts.

8. A precharged receiver drier housing as in claim 20, said means of sealing said induction tube further comprising a frangible diaphragm engageable with a puncturing probe positioned at the bottom of said housing.

9. A precharged receiver drier housing as in claim 1, in combination with:
    A. a valve connector piece having an axially aligned outlet port communicating with said induction tube and a parallel inlet port communicating with said connector fitting port.

10. A precharged receiver drier housing as in claim 9, including valve means intersecting said inlet and outlet ports, so as to valve said receiver drier with respect to an automobile refrigeration system communicating with said parts.

11. A precharged receiver drier housing as in claim 10, wherein said valve means intersect both said ports and is rotatable upon a horizontal axis from open to closed positions.

12. A precharged receiver drier housing as in claim 11, said ports having exterior threads.

13. A precharged receiver drier housing as in claim 12, said inlet port having an inner shoulder engageable with the top of said induction tube, so as to depress axially said induction tube within said housing as said valve connector is fitted onto said connector fitting port, and so as to remove said top sealing means from said connector fitting port, while urging said grangible diaphragm against said probe.

14. A precharged receiver drier as in claim 13, including a receiving sleeve positioned at the bottom of said housing, so as to receive said induction tube as it is depressed and said induction tube being plugged at its bottom registering holes in the side of said tube and said sleeve opening said tube to said housing, as said tube is depressed.

15. A precharged receiver drier as in claim 13, said means sealing said induction tube being mounted adjacent the top of said induction tube.

* * * * *

UNITED STATES PATENT OFFICE
CERTIFICATE OF CORRECTION

Patent No. 3,759,062      Dated September 18, 1973

Inventor(s) George T. Wrenn and H. William Mann

It is certified that error appears in the above-identified patent and that said Letters Patent are hereby corrected as shown below:

Filing date: August 16, 1972

Signed and sealed this 1st day of January 1974.

(SEAL)
Attest:

EDWARD M. FLETCHER, JR.
Attesting Officer

RENE D. TEGTMEYER
Acting Commissioner of Patents